(No Model.)
J. R. LE GRESLEY.
WAGON BRAKE.
No. 596,243. Patented Dec. 28, 1897.
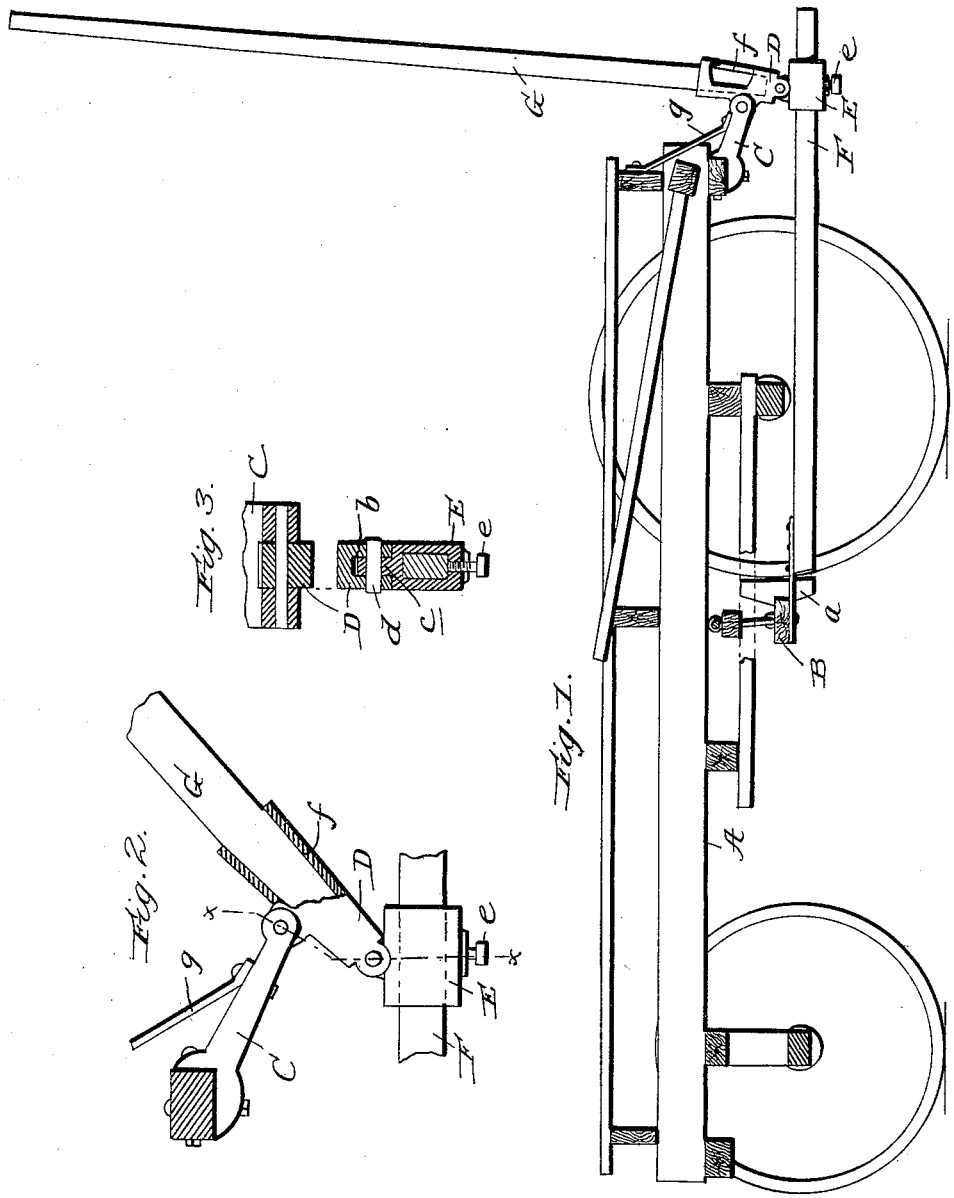

UNITED STATES PATENT OFFICE.

JAMES R. LE GRESLEY, OF FAIRFIELD, IOWA.

WAGON-BRAKE.

SPECIFICATION forming part of Letters Patent No. 596,243, dated December 28, 1897.

Application filed July 13, 1897. Serial No. 644,425. (No model.)

*To all whom it may concern:*

Be it known that I, JAMES R. LE GRESLEY, a citizen of the United States, residing at Fairfield, in the county of Jefferson and State of Iowa, have invented certain new and useful Improvements in Wagon-Brakes; and I do declare the following to be a full, clear, and exact description of the invention, such as will enable others skilled in the art to which it appertains to make and use the same.

My invention relates to improvements in wagon-brakes. It has for its general object to provide a cheap and simple and durable wagon-brake of the type designed to be conveniently applied and as conveniently released by a person seated on top of a load of hay.

The invention will be fully understood from the following description and claim when taken in conjunction with the annexed drawings, in which—

Figure 1 is a longitudinal central section of a hay-wagon equipped with my improvements. Fig. 2 is a detail elevation with parts in section, illustrating the lever of my improved brake and the manner in which it is connected with the wagon-body; and Fig. 3 is a detail section taken in the plane indicated by the line $x\ x$ of Fig. 2.

In the said drawings similar letters designate corresponding parts in all of the views, referring to which—

A indicates a hay-wagon which may be of the ordinary construction, and B indicates a transverse brake-beam which is hung from the body A, preferably in advance of the rear traveling wheels, and has shoes $a$ to engage the said wheels.

C indicates a bracket-arm, which is connected to the wagon-body, preferably at the rear end, and is braced by a strap $g$ and has its free end bifurcated, as indicated by $b$, and D indicates the brake-lever, which has the reduced portion $c$ arranged in the bifurcation $b$ of the bracket-arm and connected to said bracket-arm by the pintle or fulcrum-bolt $d$, as shown. The said lever D is provided at its lower end with a pivotally-connected sleeve E, which has a set-screw $e$, and is designed to receive and hold the bar F, which is connected to and extends rearwardly from the brake-beam, as shown. Said lever D is also provided with a socket $f$, which is designed and adapted to receive the handle G. (Better illustrated in Fig. 1 of the drawings.) The handle G extends upwardly a sufficient distance to enable a person on top of a load of hay to conveniently grasp and manipulate it, and it will be observed that when its upper end is drawn in a forward direction the brake, in virtue of the length of the handle, will be powerfully applied, and when said end is moved toward the rear the brake will be released. It will also be observed that the handle G may be readily withdrawn from the socket $f$ of the lever D to permit of the wagon passing through a low door-opening or beneath the low boughs of trees and that said handle may be as readily inserted in the socket $f$ when desired.

The manner described of connecting the lever D with the bar F permits of a ready connection and disconnection of said parts being effected when desired, and also permits of the connection being adjusted so that a long or short throw of the handle and lever D will apply and release the brake, as desired.

It will be seen from the foregoing description and the drawings that, while very cheap and simple, my improved brake is very efficient in operation and entirely obviates the necessity of a hay-wagon driver descending to the ground when he desires to apply the brakes of his wagon. It will also be observed that my improved brake may be readily applied to hay-wagons such as at present in use, which is an important advantage.

Having described my invention, what I claim is—

In the wagon-brake described, the combination of a wagon, a brake-beam connected with the body of the wagon, the longitudinally-extending bar F, connected to the beam, the bracket C, connected to one end of the wagon-body, and extending rearwardly therefrom, the lever fulcrumed on the said bracket and having the socket at its upper end, the sleeve pivotally connected to the lower end of the lever and receiving the bar F, and having a set-screw $e$, for adjustably fixing it on said bar F, and the handle removably inserted in the socket of the lever and extending upwardly, substantially as specified.

In testimony whereof I affix my signature in presence of two witnesses.

J. R. LE GRESLEY.

Witnesses:
H. C. RANEY,
M. OLGA RAINES.